Nov. 15, 1938.　　　　B. ABEL　　　　2,136,661

GAFF

Filed March 11, 1936

INVENTOR
Branson Abel
BY
Harry C. Schroeder
ATTORNEY

Patented Nov. 15, 1938

2,136,661

UNITED STATES PATENT OFFICE 2,136,661

GAFF

Branson Abel, Oakland, Calif.

Application March 11, 1936, Serial No. 68,189

5 Claims. (Cl. 43—5)

This invention relates to gaffs used in landing large fish after the latter have been caught with hook and line.

It is an object of the invention to provide a gaff which will automatically snag the fish when the former is thrust forward into contact with the fish's body.

Another object of the invention is to provide a pair of independently movable gaff hooks, on a device of the character referred to, so that movement of one of the hooks will not affect the position of the other of the hooks.

Still another object of the invention is to provide a detachable mounting for the head carrying the hooks so that the head and the handle may be conveniently separated; the handle being stored with rods or the like and the head being stored in the bait box, knapsack, or other such container.

The invention possesses other objects and features of advantage, some of which, together with the foregoing, will be specifically set forth in the specification hereunto annexed. It is to be understood, however, that the invention is not to be limited to the exact form thereof shown and described as various embodiments thereof may be employed within the scope of the appended claims.

Referring to the drawing.

Figure 1:
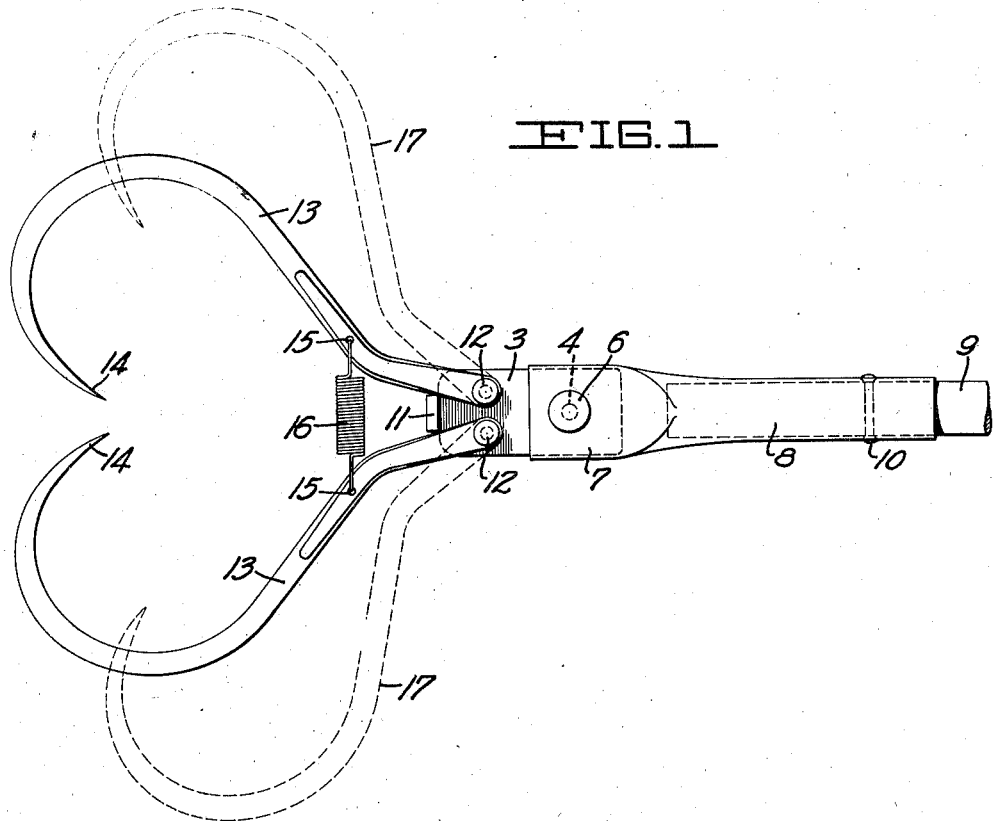
Figure 1 is a plan view of a gaff constructed according to the principles of the invention. The handle is broken off to shorten the view.
Figure 2:
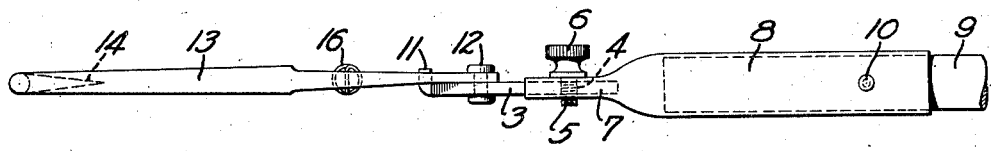
Figure 2 is a side elevational view of the structure shown in Figure 1.

In detail the gaff of my invention comprises a plate 3 having adjacent one end thereof a threaded aperture 4 which receives the threaded shank 5 of a thumb-screw 6. Flattened to provide a socket 7, of such dimensions that one end of the plate 3 will slidably engage therein, is a tubular ferrule 8, the end of which opposite to that in which the socket is formed, is left cylindrical for the reception of the end of a wooden handle 9, the latter being securely fixed in the ferrule by means of a rivet 10 passing through the handle and through the walls of the ferrule. It will be seen therefore that, by removing the thumb-screw 6, the plate 3 may be removed from the socket 7, and when so removed, the thumb-screw may be threaded into the aperture 4 for safe-keeping.

The opposite end of the plate 3 is provided with an upturned tongue 11 and a pair of spaced apertures in which rivets 12 are disposed, the latter providing pivots for a pair of opposed hooks 13 whose points 14, when the hooks are in their normal closed positions, are closely adjacent each other. The hooks are so shaped that the portions thereof, adjacent the points, will be disposed in V relationship as shown in Figure 1. Each hook, adjacent the pivoted end thereof, is provided with an aperture 15 which receives the hooked end of a tension spring 16, this spring tending to hold the hooks in their closed position. The vertical edges of the tongue 11, as is shown in Figure 1, provide a stop for the hooks and maintain the points 14 of the latter in slightly spaced relationship against the pressure of the spring which tends to bring them together.

In use, when a fish is hooked and drawn within reach of the fisherman, he or an associate, thrusts the gaff against the fish's body so that the latter enters the V between the hooks. The gaff is now further thrust forward so that the hooks will swing to the positions indicated by the dotted lines 17 of Figure 1, whereupon by pulling backward on the handle 9, the hook points will embed themselves in the fish's body and the fish may then be lifted from the water.

Gaffs, or "fish spears" as they are generally called, have been made before with opposed hooks. These hooks are however positively linked together so that when one hook is swung inwardly or outwardly the other hook will be forced, due to the positive connection, to similarly move. In gaffing some large fish which thrash considerably before they are finally subdued, it has been found that gaffs having interlinked hooks will severely tear the fish's flesh and if this thrashing continues long enough the flesh in which the gaff is embedded will become so lacerated that the gaff will lose its hold on the fish and the latter will escape.

In the gaff of my invention, I have purposely provided a resilient connection between the hooks so that each will be capable of independent movement relative to the other. Thus referring to Figure 1, if a gaffed fish in its struggles to shake off the hooks, moves transversely to the longitudinal axis of the gaff, the hook on that side will swing outwardly, still being embedded in the fish's body. When the fish finds that it cannot escape in this direction it will swing to the other side, being met by the point of the other hook which will, in the majority of cases enter a different portion of the fish's flesh than that in which it was embedded originally. It has been found that by so mounting the hooks the chances of laceration of the fish are reduced to a minimum.

What I claim is:

1. A fishing gaff comprising a handle having mounted for pivotal movement at one end thereof a pair of hooks, said hooks being capable of limited movement of different distances relative to each other, resilient means connecting said hooks, and means contacting each of said hooks for holding said hooks in slightly spaced relationship.

2. A fishing gaff comprising a handle having at one end thereof a ferrule provided with a socket, a plate having a portion thereof removably engageable with said socket, means for securing said plate in said socket, a pair of opposed hooks pivotally mounted on said plate, said hooks being capable of limited movement of different distances relative to each other, and resilient means connecting said hooks together.

3. A fishing gaff comprising a handle having at one end thereof a ferrule provided with a socket, a plate having a portion thereof removably engageable with said socket, means for securing said plate in said socket, a pair of opposed hooks pivotally mounted on said plate, said hooks being capable of limited movement of different distances relative to each other, resilient means connecting said hooks together, and a portion of said plate extending between and contacting each hook for holding said hooks in slightly spaced relationship.

4. A fishing gaff comprising a handle having at one end thereof a ferrule provided with a socket, a plate having a portion thereof removably engageable with said socket, a screw passing through said ferrule, in the socket portion thereof, and threaded into said plate, in the portion thereof engaged in said socket, for securing said plate portion in said socket, a pair of opposed pointed hooks pivotally mounted on said plate, said hooks being capable of limited movement of different distances relative to each other and having opposed portions adjacent the points thereof disposed in V-shaped relationship, a tongue on said plate extending between said hooks adjacent the pivots thereof for holding said hooks in slightly spaced relationship, and a tension spring connecting said hooks together.

5. A fishing gaff comprising a handle, a pair of hooks mounted for pivotal movement at one end thereof on said handle, said hooks being capable of limited movement of different distances relative to each other, and resilient means intermediate the ends of said hooks connecting the latter together and comprising the sole connection therebetween other than the pivotal connection of the hooks with said handle.

BRANSON ABEL.